(12) United States Patent
Ballas et al.

(10) Patent No.: US 6,188,741 B1
(45) Date of Patent: Feb. 13, 2001

(54) MACHINED STUB TUBE IN A BOTTOM HEAD OF A BOILING WATER REACTOR

(75) Inventors: Gary J. Ballas, Bellevue, WA (US); Jack T. Matsumoto, Sunnyvale; Alex B. Fife, San Jose, both of CA (US)

(73) Assignee: General Electric Company, Schenectady, NY (US)

( * ) Notice: Under 35 U.S.C. 154(b), the term of this patent shall be extended for 0 days.

(21) Appl. No.: 09/130,751

(22) Filed: Aug. 7, 1998

Related U.S. Application Data

(60) Provisional application No. 60/057,595, filed on Aug. 29, 1997.

(51) Int. Cl.[7] .................. G21C 13/00; G21C 13/028; G21C 13/036
(52) U.S. Cl. .................. 376/203; 376/204; 376/260; 376/263; 376/294; 228/184; 29/428
(58) Field of Search .................. 376/260, 263, 376/294, 203–205; 228/184; 29/428

(56) References Cited

U.S. PATENT DOCUMENTS

| | | | |
|---|---|---|---|
| 3,945,431 | * 3/1976 | Straub | 165/11 |
| 4,057,163 | * 11/1977 | Widart et al. | 220/3 |
| 5,006,300 | * 4/1991 | Jonsson et al. | 376/203 |
| 5,426,675 | * 6/1995 | Kumar et al. | 376/203 |
| 5,519,744 | * 5/1996 | Relf | 376/287 |
| 5,721,758 | * 2/1998 | Fife et al. | 376/294 |
| 5,796,797 | * 8/1998 | Fallas | 376/260 |
| 5,802,125 | * 9/1998 | Fife | 376/203 |
| 5,809,098 | * 9/1998 | Deaver | 376/203 |

\* cited by examiner

*Primary Examiner*—Charles T. Jordan
*Assistant Examiner*—Jack Keith
(74) *Attorney, Agent, or Firm*—Armstrong Teasdale LLP

(57) ABSTRACT

An integral stub tube which simplifies the reactor pressure vessel fabrication process, provides a structural transition between the penetration and head, and facilitates future remote inspection of the attachment weld is described. In one embodiment, a stub tube is machined into the bottom head dome. Specifically, a penetration is formed in the bottom head dome by a bore having a stub tube portion. The stub tube portion has a cylindrical shape and a length of the stub tube portion is selected to provide a transition between a penetration housing and an adjacent portion of bottom head dome. The penetration housing extends through the penetration, in the dome. A weld attaches the stub tube portion to the penetration housing.

14 Claims, 4 Drawing Sheets

MACHINED STUB TUBE IN A BOTTOM HEAD OF A BOILING WATER REACTOR

CROSS REFERENCE TO RELATED APPLICATION

This application claims the benefit of U.S. Provisional Application No. 60/057,595, filed Aug. 29, 1997.

FIELD OF THE INVENTION

This invention relates generally to boiling water nuclear reactors and more particularly, to sealing elongate hollow members such as control rod drive housings to a bottom head dome of a nuclear reactor pressure vessel of such reactors.

BACKGROUND OF THE INVENTION

Boiling water nuclear reactors typically include a reactor core located within a reactor pressure vessel (RPV). A known RPV includes a substantially cylindrical shell. The shell, for example, can be about twenty feet in diameter and about seven inches thick. The cylindrical shell is closed at its top end by a removable top head. The top head is removable so that components, such a fuel bundles, located in the RPV can be accessed. The RPV cylindrical shell is closed at its bottom end by a dome shaped bottom head assembly welded to the shell.

A plurality of openings, sometimes referred to as penetrations, are formed in the bottom head dome so that components, such as control rod drive assemblies, can extend within the RPV. Typically, a substantially cylindrical stub tube having a bore extending therethrough is welded to the bottom head dome and the tube bore aligns with an opening in the bottom head dome. The cylindrical stub tube typically is fabricated from a corrosion resistant material such as stainless steel or Ni—Cr—Fe.

With a control rod drive assembly, for example, the control rod drive housing, e.g., a tube, is inserted through the bottom head dome opening and stub tube bore, and the housing extends into the RPV. The control rod drive (CRD) housing is welded to the stub tube to maintain the housing in the desired position. The stub tube thus serves as a transition piece between the bottom head dome, which typically is fabricated from low alloy steel (LAS), and the CRD housing, which typically is fabricated from stainless steel.

Stress corrosion cracking (SCC) is a known phenomenon occurring to adjacent stub tube welds connecting the bottom head dome to the stub tube and connecting the stub tube to the CRD housing. Particularly, the stub tube welds are subject to a variety of stresses associated with, for example, differences in thermal expansion, the operating pressure needed for the containment of the reactor cooling water, and other sources such as residual stresses from welding, cold working and other inhomogeneous metal treatments. Such stresses may, at times, cause cracks adjacent the stub tube welds or may even cause cracks in the weld materials.

To avoid SCC, it is desirable to eliminate welds. In addition, the welds which are required should be inspectable. It would be desirable to provide a stainless steel penetration to LAS head attachment that eliminates the stub tube to head weld, meets all design stress requirements, and simplifies fabrication.

SUMMARY OF THE INVENTION

These and other objects may be attained by an integral stub tube which simplifies the reactor pressure vessel fabrication process, provides a structural transition between the penetration and head, and facilitates future remote inspection of the attachment weld. In one embodiment, a stub tube is machined into the bottom head dome. Specifically, a penetration is formed in the bottom head dome by a bore having a stub tube portion. The stub tube portion has a cylindrical shape and a length of the stub tube portion is selected to provide a transition between a penetration housing and an adjacent portion of bottom head dome. The penetration housing extends through the penetration, in the dome. A weld attaches the stub tube portion to the penetration housing.

The above described integral stub tube provides a pressure boundary attachment at the junction between control and instrumentation housings and the bottom head of the pressure vessel. Such stub tube also provides a structural transition between the penetration housing (which is typically austenitic stainless steel) and the LAS bottom head. This structural transition provides a transition in stiffness and smooths out temperature gradients, and has the advantage of being an integral part of the bottom head.

In addition, such integral stub tube requires only one weld for each penetration, and the weld is axisymmetric. An axisymmetric weld is easier to make than a non-axisymmetric weld. Requiring just one weld for each penetration also reduces the number of welds that must be inspected during service by eliminating the stub tube to head weld. The weld also is readily accessible for inspection.

Also, all machining required to form the stub tube portion can be performed by conventional boring and tree-panning operations. Complex multi-axis machining is eliminated, which results in a potential fabrication cost savings as compared to known stub tubes. Reliability of the reactor is believed to be improved and the risk of future materials related problems is reduced because Ni—Cr—Fe material is not used in the stub tube.

DETAILED DESCRIPTION

Figure 1:
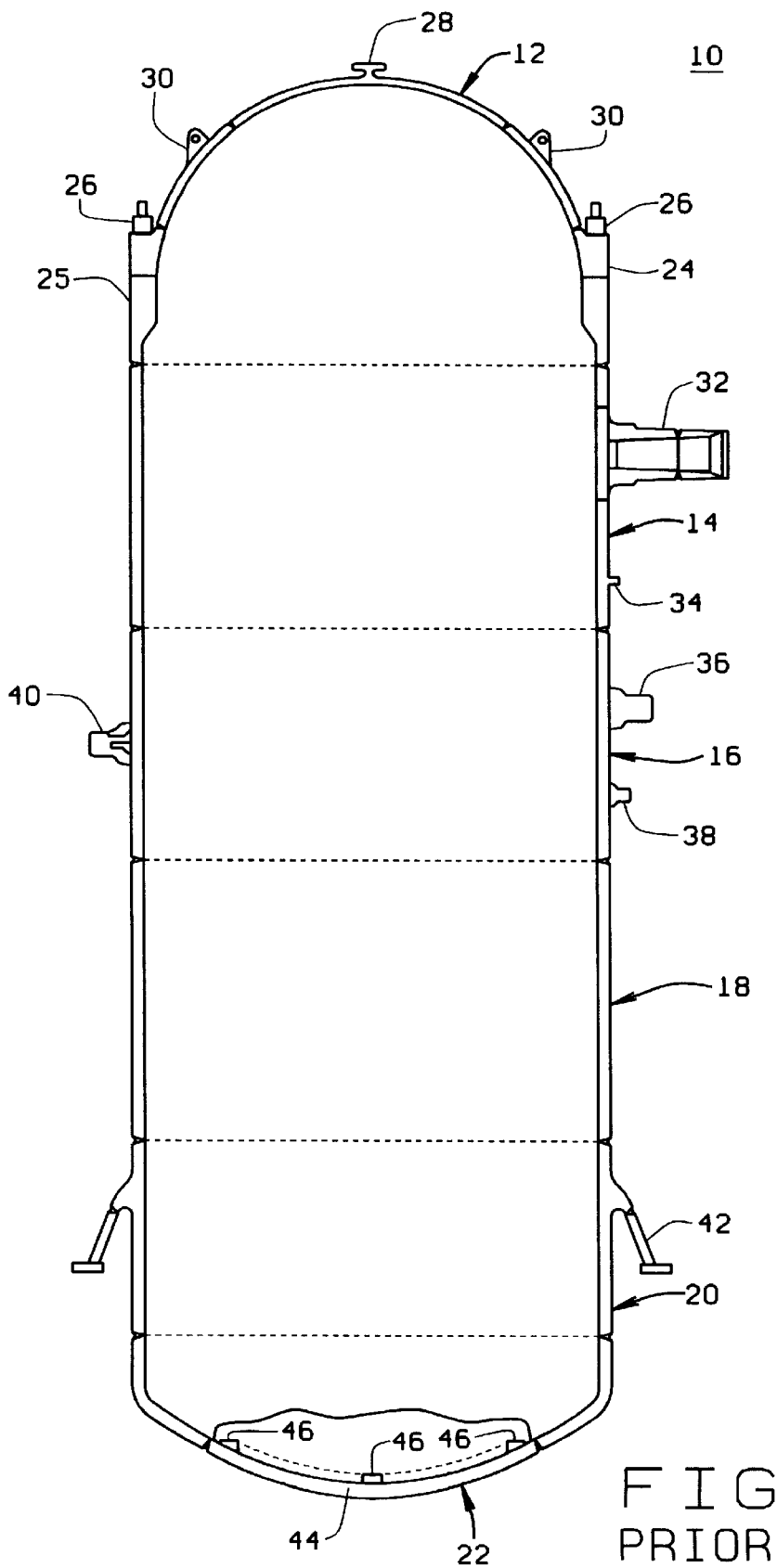
FIG. 1 is a schematic illustration of a known reactor pressure vessel.

FIG. 1 is a schematic illustration of a known reactor pressure vessel (RPV) 10, RPV 10 includes a top head 12, four substantially cylindrical shell courses 14, 16, 18 and 20, and a bottom head assembly 22. Top head 12 includes a head flange 24. First shell course 14 includes a vessel flange 25. Top head 12 is bolted to first shell course 14 by bolts 26 which extend through head flange 24. Top head 12 also includes a head spray and vent nozzle 28 and lifting flanges 30 used when lifting top head 12 from first shell course 14.

First shell course 14 includes main steam nozzles 32 through which steam flows out of the RPV 10. Stabilizer brackets 34 also are formed on first shell course 14. Second shell course 16 has a number of nozzles 36, 38 and 40 formed therein. Fourth shell course 20 includes a support skirt 42 welded thereto. Support skirt 42 is utilized to support RPV 10 within the reactor building (not shown).

Bottom head assembly 22 includes a bottom head dome 44 having a plurality of stub tubes 46 welded thereto. Stub tubes 46 are substantially cylindrical and each stub tube 46 has a bore (not shown in FIG. 1) extending therethrough. The bore of each stub tube 46 is aligned with an opening (not shown in FIG. 1) in bottom head dome 44. Components such as control rod drives, incore instruments, pressure instrument nozzles, and drain nozzles extend through such bottom head dome openings and stub tube bores and penetrate into RPV 10.

FIG. 1 is provided primarily for illustrative purposes to show a typical bottom head assembly 22. It should be understood that some reactors have 276 pressure boundary penetrations in the RPV bottom head, i.e., 205 control rod penetrations, 62 incore instrument penetrations, 8 pressure instrument nozzles, and 1 drain nozzle. By reducing the number of welds in pressure boundary components, many advantages can be achieved including reducing the number of welds subjected to SCC and more simplified fabrication.

Figure 2:
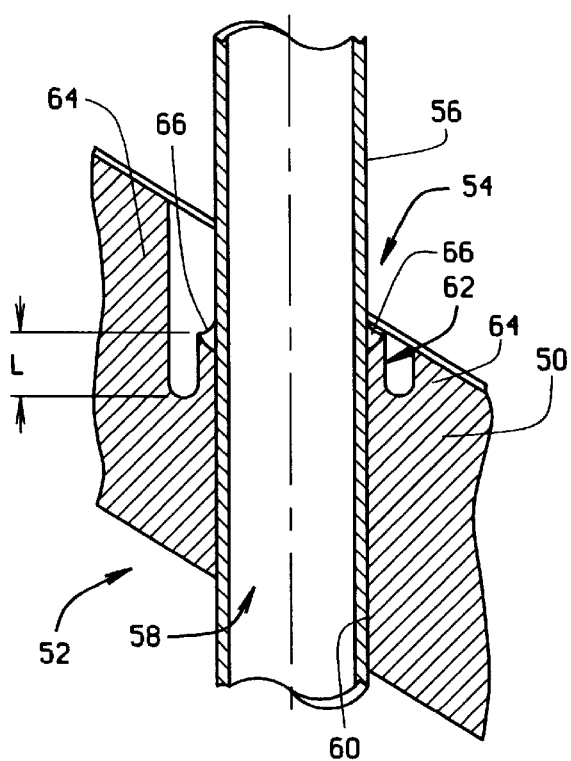
FIG. 2 is a cross sectional view of a portion of a bottom head dome having an integral stub tube in accordance with one embodiment of the present invention.

FIG. 2 is a cross sectional view of a portion 50 of a bottom head dome 52 having an integral stub tube 54 in accordance with one embodiment of the present invention. A penetration tube or housing 56 is shown extending through an opening, or penetration 58, in dome 52. Penetration 58 is formed by a bore 60 having a stub tube portion 62. Stub tube portion 62 has a cylindrical shape and a length L of stub tube portion 62 is selected to provide a transition between penetration housing 56 and an adjacent portion 64 of bottom head dome 52. A weld 66 attaches stub tube portion 62 to penetration housing 56.

Penetration housing 56 may be fabricated, for example, from austenitic stainless steel, and bottom head dome 52 is fabricated from a low alloy steel. Of course, materials other than austenitic stainless steel and low alloy steel can be used for such components.

Figure 3:
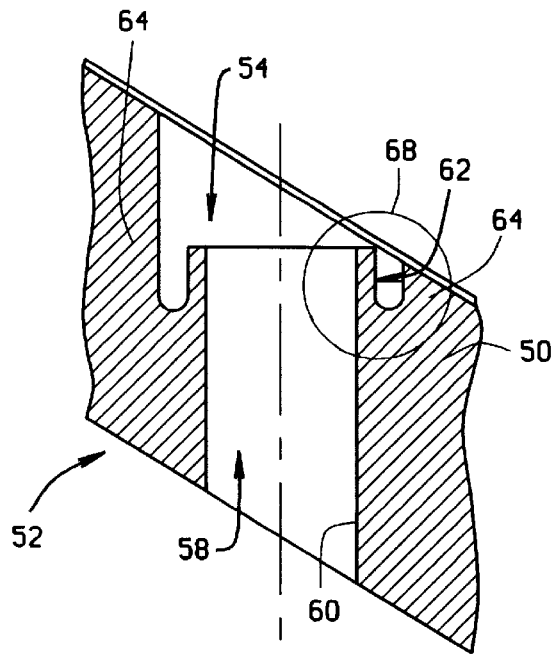
FIG. 3 is a cross sectional view of the integral stub tube shown in FIG. 1 without the penetration tube extending therethrough.

FIG. 3 is a cross sectional view of integral stub tube 54 shown in FIG. 1 without penetration housing 56 extending therethrough. The area enclosed by circle 68 is shown in more detail, and in connection with alternative weld preparations, in FIGS. 4A, 4B, and 4C. As described above, length L of machined stub tube 54 is selected to provide an adequate transition between penetration housing 56 and other portions of bottom head dome 52. For example, in one specific reactor configuration, generally referred to as the Advanced Boiling Water Reactor (ABWR) of General Electric Company, a minimum length L of 30 mm is believed to be required for control rod drive type penetrations.

In addition, the geometry of stub tube portion 62 can be adjusted for penetrations and reactors of different sizes. For example, the dimensions of stub tube portion 62 can be adjusted for different design pressures, other design loads, and thermal transients. Stub tube portion 62 shown in FIG. 3 is configured for penetrations in the ABWR.

Figure 4A:
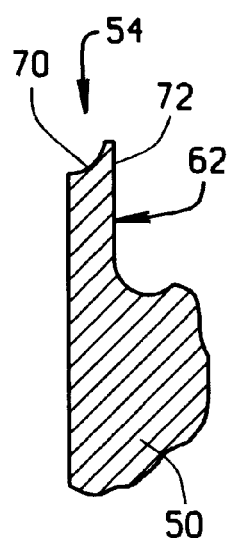
FIGS. 4A, 4B, and 4C are detailed views of respective embodiments of portions of the integral stub tube shown in FIG. 2.
Figure 4B:
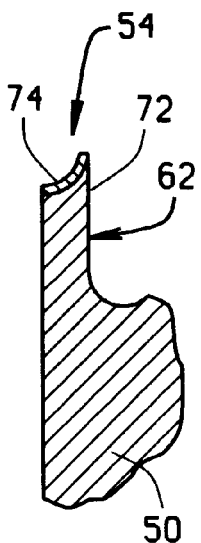
Figure 4C:
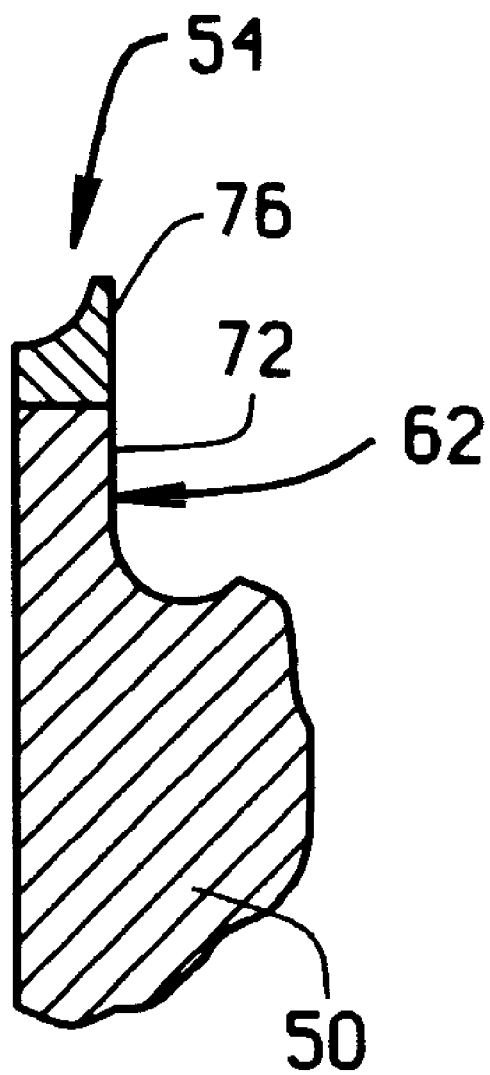

FIGS. 4A, 4B, and 4C are detailed views of respective embodiments of portions of integral stub tube 54 shown in FIG. 3 within circle 68. Referring to FIG. 4A, a groove 70 is machined in an end 72 of stub tube portion 62 to facilitate welding end 72 to a penetration housing 56. As shown in FIG. 4B, weld butter 74 can be located on end 72 to further facilitate such welding. A weld build-up 76, as shown in FIG. 4C, could be formed on stub tube portion end 72. For a typical boiling water reactor (BWR) application, the weld preparation option shown in FIG. 4A may not be viable due to the characteristics of the low alloy steel of bottom head dome. Weld preparation options shown in FIGS. 4B and 4C are, however, believed to be viable for BWR application.

Stub tube portion 62 is formed in bottom head dome 52 using known machining techniques including counter-boring, tree-panning, and boring. The weld preparation for penetration-to-stub tube weld 66 is then made on end 72. Penetration housing 56 is welded to end 72. All machining and welding is axisymmetric, and weld 66 is inspectable by UT from the inner diameter of housing 56.

The machined stub tube is adaptable for different penetration-to-stub tube, weld configurations. Depending upon the materials of construction, a transition material may be needed between penetration housing 56 and stub tube portion 62. The transition material facilitates welding and keeps the weld heat affected zone out of the pressure vessel material.

Integral stub tube 54 could, of course, be used in many pressure vessel configurations and applications. Common applications include, but are not limited to, use in connection with penetration housings having cylindrical shapes, penetrations arranged in a close pattern rather than isolated penetrations which would be treated as nozzles, parallel penetration housings, penetrations in the pressure vessel cylindrical shell section or in the spherical radius heads. Additional applications include reinforcement for openings in the pressure boundary fully contained in the pressure boundary member. For example, if the penetrations are in a pressure vessel head having a spherical shape, the reinforcement for the opening is fully contained in the head. Also, the penetrations do not need to be all the same size.

The above described integral stub tube provides a pressure boundary attachment at the junction between control and instrumentation housings and the bottom head of the pressure vessel. Such stub tube also provides a structural transition between the penetration housing (which is typically austenitic stainless steel) and the LAS bottom head. This structural transition provides a transition in stiffness and smooths out temperature gradients, and has the advantage of being an integral part of the bottom head.

In addition, such integral stub tube requires only one weld for each penetration, and the weld is axisymmetric. An axisymmetric weld is easier to make than a non-axisymmetric weld. Requiring just one weld for each penetration also reduces the number of welds that must be inspected during service by eliminating the stub tube to head weld. The weld also is readily accessible for inspection.

Also, all machining required to form the stub tube portion can be performed by conventional boring and tree-panning operations. Complex multi-axis machining is eliminated, which results in a potential fabrication cost savings as compared to known stub tubes. Reliability of the reactor is believed to be improved and the risk of future materials related problems is reduced because Ni—Cr—Fe material is not used in the stub tube.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A bottom head for a boiling water reactor, said bottom head comprising a plurality of penetrations therethrough, at least one of said penetrations comprising a stub tube portion and a bore extending through said stub tube portion, said stub tube portion machined into an inside surface of said bottom head so that said stub tube portion does not extend beyond said bottom head inside surface, said stub tube portion comprising an end configured to be welded to a penetration housing.

2. A bottom head for a boiling water reactor in accordance with claim 1 wherein said stub tube portion has a cylindrical shape and a length of said stub tube portion is selected to provide a transition between the penetration housing and an adjacent portion of said bottom head.

3. A bottom head for a boiling water reactor in accordance with claim 1 wherein said stub tube portion end has a groove therein.

4. A bottom head for a boiling water reactor in accordance with claim 1 wherein said stub tube portion end has weld butter thereon.

5. A bottom head for a boiling water reactor in accordance with claim 1 wherein a weld build-up is on said stub tube portion end.

6. A bottom head for a boiling water reactor in accordance with claim 1 wherein at least two penetrations are machined by identical axisymmetric boring and tree-panning operations.

7. A bottom head for a boiling water reactor in accordance with claim 1 wherein at least two penetrations allow for identical axisymmetric welding operations including at least one of stub tube weld preparation and welding said stub tube portion to a cylinder penetrating therethrough.

8. A bottom head for a reactor pressure vessel, said bottom head comprising:

an inside surface;

a bore extending therethrough; and a stub tube machined in said bottom head inside surface so that said stub tube does not extend beyond said inside surface, said machined stub tube located at one end of said bore.

9. A bottom head in accordance with claim 8 wherein said machined stub tube comprises an end configured to be welded to a penetration housing.

10. A bottom head in accordance with claim 8 wherein said machined stub tube comprises a cylindrical shape.

11. A bottom head in accordance with claim 9 wherein said machined stub tube end has a groove therein.

12. A bottom head in accordance with claim 11 wherein said machined stub tube end has weld butter thereon.

13. A bottom head in accordance with claim 9 wherein a weld build-up is on said machined stub tube end.

14. A bottom head in accordance with claim 8 further comprising:

a plurality of bores extending therethrough; and a plurality of stub tubes machined in said bottom head, each said machined stub tube located at one end of a corresponding bore.

* * * * *